United States Patent
Lieberman et al.

(10) Patent No.: US 11,295,300 B2
(45) Date of Patent: Apr. 5, 2022

(54) ONLINE IMAGE RETENTION, INDEXING, SEARCH TECHNOLOGY WITH INTEGRATED IMAGE LICENSING MARKETPLACE AND A DIGITAL RIGHTS MANAGEMENT PLATFORM

(71) Applicants: Stevan H. Lieberman, Silver Spring, MD (US); Michael St. John, Milford, PA (US)

(72) Inventors: Stevan H. Lieberman, Silver Spring, MD (US); Michael St. John, Milford, PA (US)

(73) Assignee: Digital Candy, Inc., Washington, DC (US)

( * ) Notice: Subject to any disclaimer, the term of this patent is extended or adjusted under 35 U.S.C. 154(b) by 499 days.

(21) Appl. No.: 15/735,574

(22) PCT Filed: Jun. 10, 2016

(86) PCT No.: PCT/US2016/037019
§ 371 (c)(1),
(2) Date: Dec. 11, 2017

(87) PCT Pub. No.: WO2016/201324
PCT Pub. Date: Dec. 15, 2016

(65) Prior Publication Data
US 2018/0300714 A1   Oct. 18, 2018

Related U.S. Application Data

(60) Provisional application No. 62/173,440, filed on Jun. 10, 2015.

(51) Int. Cl.
G06Q 20/40 (2012.01)
G06Q 30/02 (2012.01)
G06Q 20/32 (2012.01)
G06Q 20/34 (2012.01)
G06Q 20/38 (2012.01)
(Continued)

(52) U.S. Cl.
CPC .......... *G06Q 20/38* (2013.01); *G06F 3/0482* (2013.01); *G06F 3/0483* (2013.01);
(Continued)

(58) Field of Classification Search
CPC ..... G06Q 20/00–425; G06Q 30/00–08; G06Q 2220/00–18; G06F 16/00–986;
(Continued)

(56) References Cited

U.S. PATENT DOCUMENTS 7,499,566 B2 * 3/2009 Rhoads .................. G06T 1/0021
382/100
7,702,185 B2 * 4/2010 Keating ................ G06F 16/583
382/305
(Continued)

*Primary Examiner* — John W Hayes
*Assistant Examiner* — Chenyuh Kuo
(74) *Attorney, Agent, or Firm* — Michael L. Greenberg, Esq.; Greenberg & Lieberman, LLC

(57) ABSTRACT

An online image search and marketplace platform and browser plug-in system is described. The system is configured to execute image-based searches of the Internet to correlate hosted images with ownership and licensing metadata, facilitating the marketing of images to users and expediting the purchase of licensing for said images. The system employs an online platform in communication with an image metadata database, providing a conduit for users to execute an image search from an image search field populated by a target image URL or direct image upload. An auto-cropping feature combined with extensive steganography integration ensures accurate image identification, ownership mapping, and usage tracking. The browser plug-in facilitates the execution of an image search within the right-click menu of any image hosted to the Internet. Image tracking enables content owners to be alerted in real-time when unlicensed use of content is detected.

3 Claims, 5 Drawing Sheets

(51) Int. Cl.
*G06F 16/951* (2019.01)
*G06K 9/62* (2022.01)
*G06K 9/46* (2006.01)
*G06F 3/04845* (2022.01)
*G06Q 30/06* (2012.01)
*G06F 16/58* (2019.01)
*G06F 3/0482* (2013.01)
*G06F 3/0483* (2013.01)
*H04L 67/02* (2022.01)

(52) U.S. Cl.
CPC .......... *G06F 3/04845* (2013.01); *G06F 16/58* (2019.01); *G06F 16/951* (2019.01); *G06K 9/4642* (2013.01); *G06K 9/4671* (2013.01); *G06K 9/6212* (2013.01); *G06Q 30/06* (2013.01); *G06Q 2220/18* (2013.01); *H04L 67/02* (2013.01)

(58) Field of Classification Search
CPC .......... G06F 3/00–167; G06K 9/00–82; H04L 67/00–42
See application file for complete search history.

(56) References Cited

U.S. PATENT DOCUMENTS

| | | | |
|---|---|---|---|
| 7,756,866 B2* | 7/2010 | Bhalotia | G06F 16/58 707/723 |
| 2005/0018873 A1* | 1/2005 | Rhoads | G06Q 20/40145 382/100 |
| 2011/0119293 A1* | 5/2011 | Taylor | G06F 21/10 707/769 |
| 2013/0002842 A1* | 1/2013 | Das | H04N 7/18 348/65 |

* cited by examiner

ONLINE IMAGE RETENTION, INDEXING, SEARCH TECHNOLOGY WITH INTEGRATED IMAGE LICENSING MARKETPLACE AND A DIGITAL RIGHTS MANAGEMENT PLATFORM

CONTINUITY

This application is a non-provisional application of provisional patent application No. 62/173,440, filed on Jun. 10, 2015, and priority is claimed thereto.

FIELD OF THE PRESENT INVENTION

The field of the present invention relates to the retention, finding, organization and distribution of proprietary image data or otherwise protected images, and more specifically relates to a process of searching for images online regarding licensing, use, and ownership metadata, coupled with an online interface configured to expedite the purchase of a license for use of said images by a user, and to notify content owners of unlicensed use of content online.

BACKGROUND OF THE PRESENT INVENTION

It is known that the Internet continues to grow in size and application exponentially every day. The sheer number of newly uploaded pieces of content to the Internet, from news and blog articles, to professionally designed graphics and personal pictures, is being expanded every minute. Many websites hosting news, blogs, and similar web articles frequently accompany stories and posts with images to further entice the reader and to contextually and visually engage him or her more deeply into the story. Commonly, writers and editors employ the Internet to search for images that pertain to the story, which they are looking to publish. Per convention and US law, images that are in the public domain may generally be used without permission; and may even be used for profit in many cases. Images licensed under the Creative Commons license may be licensed for use, often for free, with permission, but require attribution to the owner of the image license. Oftentimes, these images may not be used for profit. Other, non-copywritten and non-registered images are frequently uploaded online without formal protection. However, in all cases, permission to use such images should be ascertained prior to public use.

Conversely, owners of images online commonly experience difficulty determining when and if their images are in use without permission, which would be an act of infringement of the intellectual property of the owner. Unless a content owner personally scours the Internet to detect infringement, it remains unlikely that the creator and/or owner of the image would be made aware of infringement in a timely manner. In many cases, infringement remains unchecked, as it is the duty of the owner to call out and prosecute, if necessary, cases of non-licensed infringement of his or her intellectual property. If there were a means by which image owners would be automatically notified of unlicensed use of their content, cases of infringement would decline, and prosecution of infringement cases may be served more expeditiously.

Given the staggering size of the ever-growing Internet, it has become increasingly difficult for writers, editors and publishers to identify the true owners of many images online. Therefore, requesting or paying for permission to license these images can be nearly impossible unless the image is hosted and/or supplied by a registered image marketplace such as www.istockphoto.com, www.bigstockphoto.com, or other stock photo or similar image marketplaces. If a user cannot determine ownership of an image online, payment for a license is impossible, leading many users to unlawfully use the image without permission. Ideally, there should exist a convenient, seemingly omniscient image marketplace and query system capable of returning image ownership, licensing, and other metadata at will in real-time to facilitate an image license purchase.

A small number of image search services are available on the market today that provide a means for users to ascertain the origin metadata of an image online via the image URL, or by uploading a copy of the image. Unfortunately, nearly all of the image search services available today are inaccurate, because they are solely using key words and meta data to ascertain a match for the image or those that do not are just not very accurate. The two competitors that have the best current available technology that are not solely reliant on key words and meta are Google™ and TinEye™. Google of course has the advantage in producing better image search results, as it has billions of images, and therefore has extensive training data. Training data is the use of previously defined images to train a computer system to understand what to look for when looking for a particular object or part of an object (the renowned blind man describing the elephants trunk).

However, Google does not provide sub-filtering of image search results, and also does not allow a user to frame a portion of the image of which they are most interested in, and Google continues to primarily use a method of image identification in association with a conventional bag of visual words search technology (histogram representation based on independent features of an image) while ignoring most available methods for image similarity identification, nor does Google provide an API to allow third party access to the Google's image search technology. Tineye does have an API, and does license its image search technology. However, Tineye does not have nearly as large a database as Google, and thus has a very small amount of training data (estimated only about 10 million images), and only uses known algorithms vs customized ones. Therefore, Tineye can provide no better image search results and ranking than Google, as Tineye does not have the same amount of images stored on the Google datacenter (estimated to be more than 1 trillion), Tineye cannot provide any meaningful nor comprehensive correlation of image ownership to images across the Internet. A new means of storing images, or rather the essence of an image, is required in order to minimize database storage required for competent image search execution, and to expedite the image search process.

Without easy location of the image owner, licensing for use is effectively impossible. Conversely, without a means for image owners to detect when their property is in use online, image infringement commonly goes unnoticed, and therefore unprosecuted and certainly un-monetized. The exponentially growing number of images online further exacerbates this problem.

Although the science of steganography is known, it is not used by any mass online image searching tool nor image matching service. If the use of steganography was employed in a component of an image marketplace, image identification, and subsequent licensing/sale would be facilitated.

Thus, there is a need for a new, more accurate image search and image marketplace system configured to facilitate the image storage, the identification of images correlated to ownership metadata, the licensing of images for use, and the alerting of content owners of existing image infringement in real-time. Such an image marketplace system would preferably be configured to facilitate the communication and potential transaction between image buyers/licensors and image owners.

SUMMARY OF THE PRESENT INVENTION

The present invention is a system and method for the storage, identification, categorization, filtering, licensing, and distribution of images online via an image search portal and image licensing browser plug-in. An online platform is employed to facilitate the searching of images by a user based on a target image accessible via the image URL or an uploaded image copy. The online platform is configured to execute a search of the Internet for (a) the image itself, (b) similar images and to correlate information about the image with all available data pertaining to the use of the target image being searched for, as well as image metadata relating to the ownership, licensing status, distribution options, and purchase information (available to the non-owner of the target image, while also providing income information to the owner of the target image. The target image may be automatically cropped or manually cropped within the platform of the present invention to more easily search for uses of a specific portion of the image online, facilitating more effective image mapping.

The storage of large numbers of images is a problem, as it creates massive and ongoing storage costs. The platform of the present invention has been designed such that it does not require the storage of the actual digital images. The solution provided by the present invention is to take an image in its original form, index its unique features, and store them as vectors inside the index without duplication across features from different images. These features are then removed, creating a shell of the image excluding the elements that make the image storage large. The shell is then stored. If the original image is required for display, the indexed features are applied to the shell, reproducing the original image with all of its elements.

The system of the present invention additionally employs a browser plug-in, which integrates a quick-access menu into the right-click drop-down menu of a hosted image displayed within the Internet browser. The browser plug-in enables a user to right-click on any image on the Internet and quickly ascertain information relating to the use of the image, and provides a direct avenue to purchase a license for use of the selected (clicked) image and/or save the image as an image of interest in the user's account in the platform of the present invention. In effect, this application of the system of the present invention ostensibly converts the Internet itself into an integrated image marketplace, as every image displayed to a user within the browser window equipped with the browser plug-in of the present invention may be right-clicked on a computer (or tapped and held on a tablet or mobile device), presenting the user with image information and licensing options. Users are also presented with a direct avenue to clear the rights to images quickly and easily if applicable. Internal to the application itself, the user may drag numerous images to the search field and see the ownership information at a glance, and even buy all required rights for the users' application as required in bulk. As video is merely a large number of images, this can be done with video as well.

In short, the solution performed and executed by the system of the present invention is as follows: The system employs a new set of algorithms and processes which facilitate the storing and identification of images by using (a) a new image storage method, (b) image filtering based on an array of algorithms, image elements, and filters rather than the conventional "bag of visual words" model, (c) a free image stamping system which cross indexes images with ownership information, and (d) a comprehensive browser plug-in to make the latter information easily accessible by a user.

BRIEF DESCRIPTION OF THE DRAWINGS

The present invention will be better understood with reference to the appended drawing sheets, wherein.

DETAILED DESCRIPTION OF THE PREFERRED EMBODIMENT

Figure 1:
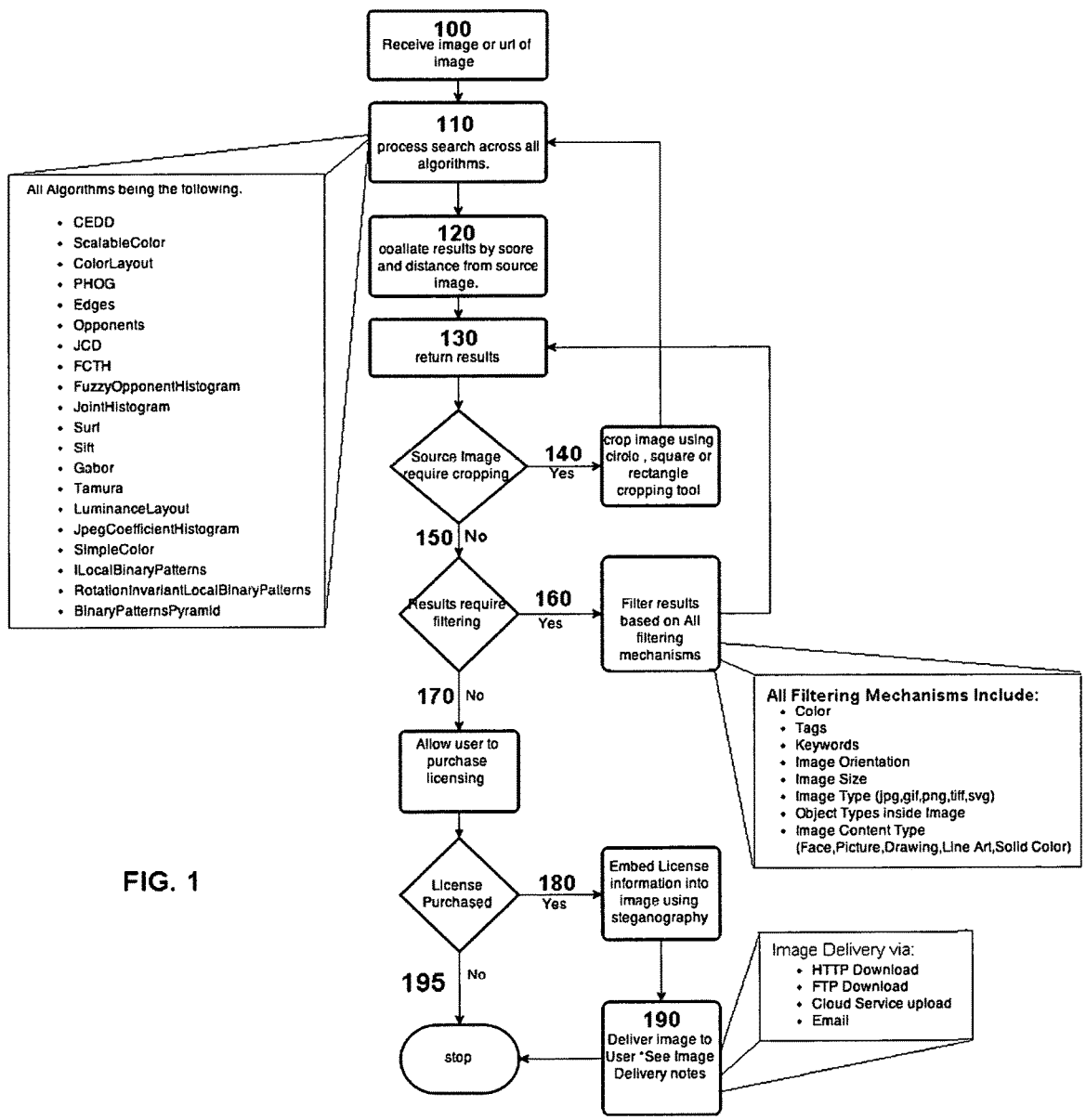
FIG. 1 exhibits a flow chart detailing the back end processes executed by the system of the present invention during use.
Figure 2:
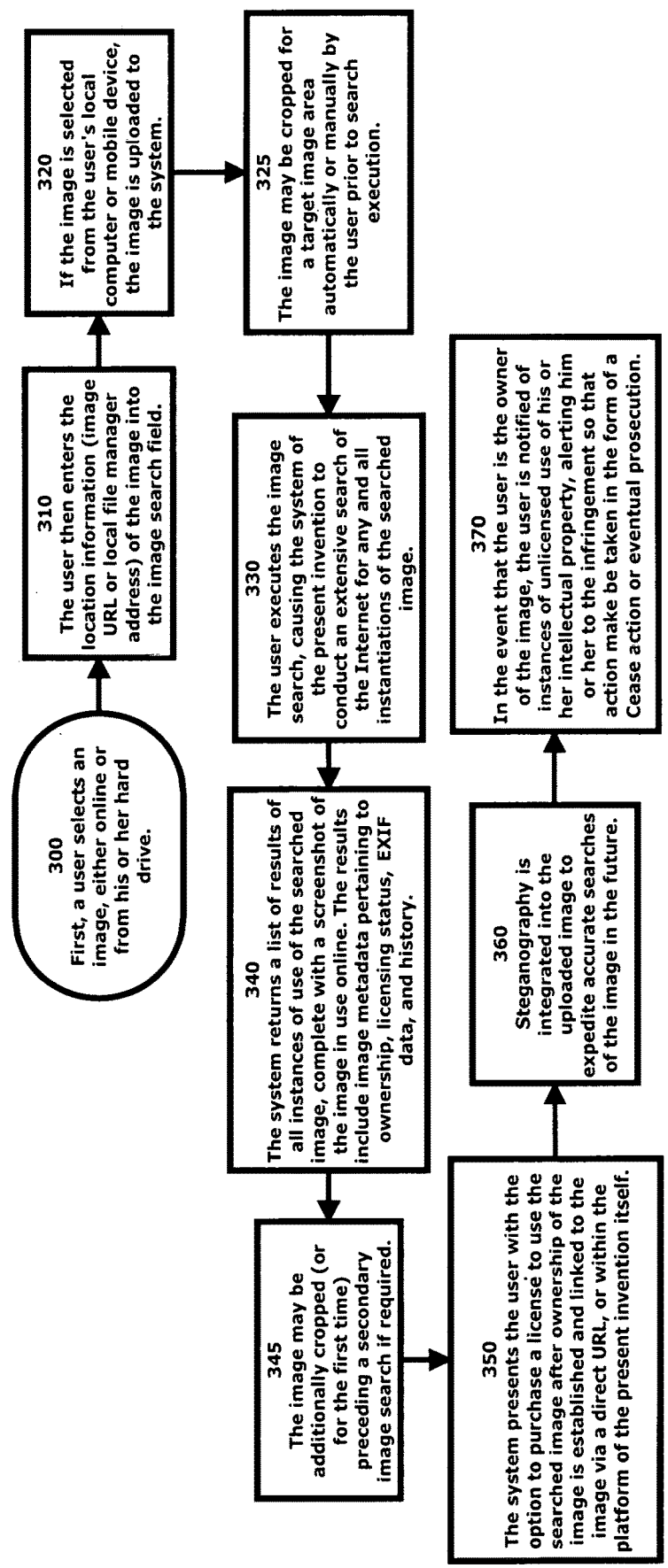
FIG. 2 is a flow chart that details the method of use of the present invention by a user searching for images from the platform of the system of the present invention.
Figure 3:
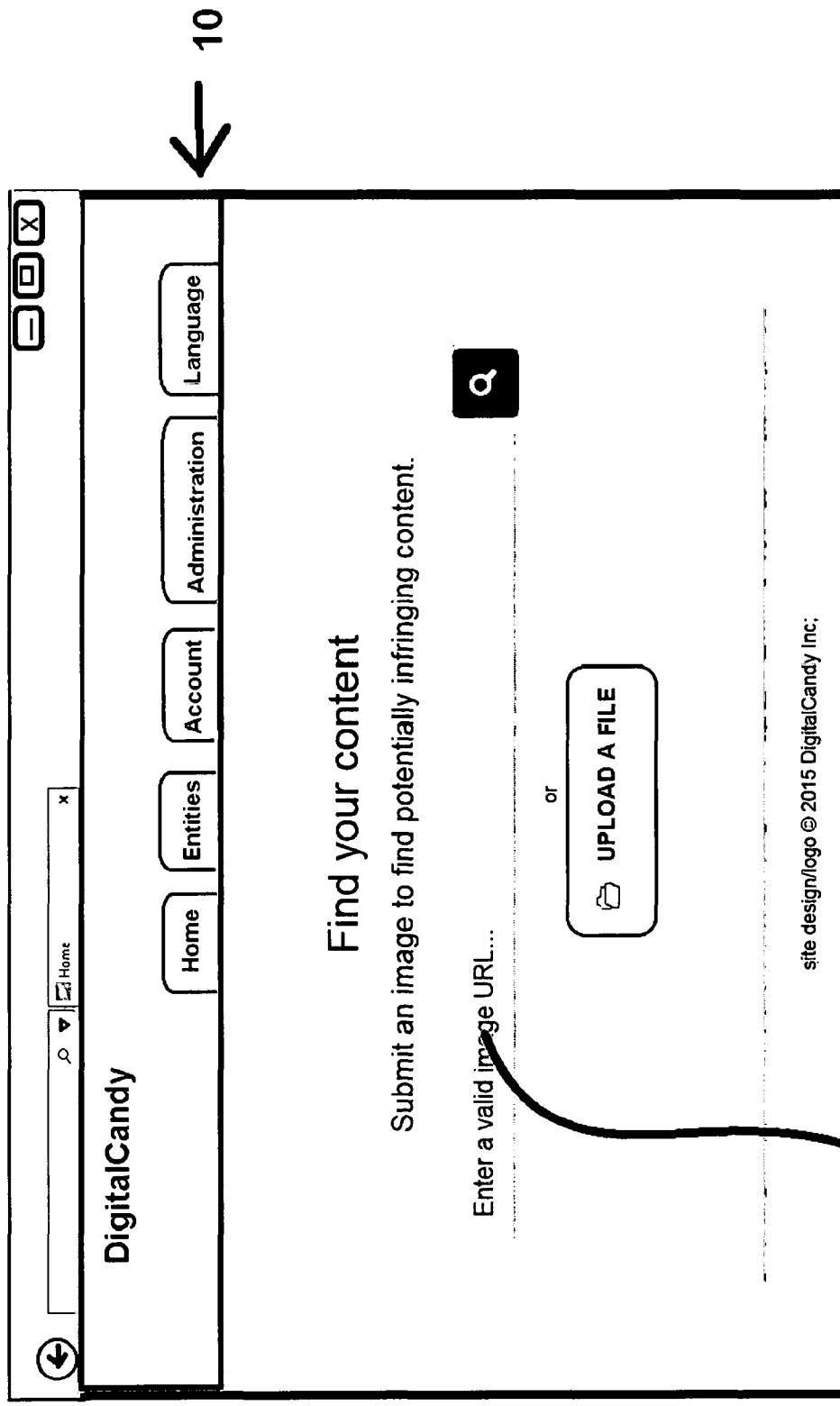
FIG. 3 displays an example screenshot of the image search and identification online platform.

The present invention generally comprises a system and method configured to expeditiously identify an image online via an executed image search, return image metadata, including but not limited to ownership information, licensing status (fair use, Creative Commons, etc.), creation date, instances of licensed and unlicensed use, and EXIF data (if applicable), and facilitate purchasing of a license to use the image directly via a web interface, mobile device or integrated browser plug-in (20). The system of the present invention is embodied either by an online platform (10) and the integrated browser plug-in (20), or through an API, which provide a means for users or systems to access the image search system (back end which preferably uses an Apache Solr and Lucene platform) of the present invention. An image metadata database is preferably employed by the present invention to aggregate searched image data, facilitate machine learning processes which expand the systems reach through clustering, auto-tagging, recommending and expediting future access, helping to ensure a consistent record of use for each image. The metadata database may have any information about the image required including, but not limited to ownership information, ownership transfer/assignment information, copyright numbers, image specific information such as colors, size, date, place, resolution, etc. The image metadata database is pinged and updated with each image search executed via the system of the present invention.

The online platform (10) of the present invention is preferably equipped with an image search field (30) configured to be populated with an image URL or file manager address of an image for upload. Once an image has been targeted via upload or image URL in the image search field (30), the system of the present invention executes an image search for any and all instances of the image on the Internet, as well as closest matches, then returns and displays the results to the user. It should be understood that the present invention facilitates the purchase, sale, or licensing of a digital image via the online platform (10) as well as via the integrated browser plug-in (20), preferably via a 'license image' button, 'buy image' button, 'file infringement claim' button, and other pertinent buttons relating to image marketplace functionality.

Upon display of the results, the user may opt to crop the image and execute a secondary search on the modified image, filtering the results by the closest or most relevant matches. Filtering will also be available with a focus on different feature set elements (color, hue, line, etc.) not based on cropping. Additionally, the system of the present invention employs an auto-cropping feature configured to automatically crop an image according to an assumed focal point of the image determined via an internal image reading algorithm. Feature sets may also be chosen manually via the interface to help algorithm focus. Any steganography present in the image is employed to best match the image to copies in use or hosted online as well as use of the information in the meta database. EXIF data is employed to match and associate image copies if present. Users of the system of the present invention via the online platform (10) may arrange to purchase a license to use an image or images once the owner of the image is detected by the image search algorithms or steganography information in the image of the present invention.

Algorithms are used as the best methods for a user to perform the current search based upon user requirements. Search algorithms employed by the present invention preferably include: CEDD, ScalableColor, ColorLayout, PHOG, Edges, Opponents, JCD, FCTH, FuzzyOpponentHistogram, JointHistogram, Surf, Sift, Gabor, Tamura, LuminanceLayout, JpegCoefficientHistogram, SimpleColor, ILocalBinaryPatterns, RotationInvarientLocalBinaryPatterns, and/or BinaryPatternsPyramid. Additionally, using machine learning processes, the system classifies the images based on its stored vector data as well as any EXIF data, keyword, and tagging information present, which compliments the search algorithms by allowing comprehensive searching based inside classified (categorized) groups.

Use of the system of the present invention by a user is preferably conducted via the online platform (10) and/or the integrated browser plug-in (20) of the present invention. Under standard circumstances, use of the present invention is preferably enacted as follows:

First, a user selects an image, either online or from his or her hard drive. (300) The user then enters the location information (image URL or local file manager address) of the image into the image search field. (310) If the image is selected from the user's local computer or mobile device, the image is uploaded to the system. (320) The image may be cropped for a target image area automatically or manually by the user prior to search execution. (325) The user executes the image search, causing the system of the present invention to conduct an extensive search of the Internet for any and all instantiations of the searched image. (330) The system returns a list of results of all instances of use of the searched image, complete with a screenshot of the image in use online. The results include image metadata pertaining to ownership, licensing status, EXIF data, and history. (340) The image may be additionally cropped (or for the first time) preceding a secondary image search if required. (345) The system presents the user with the option to purchase a license to use the searched image after ownership of the image is established and linked to the image via a direct URL, or within the platform of the present invention itself (350) Steganography is integrated into the uploaded image to expedite accurate searches of the image in the future. (360) In the event that the user is the owner of the image, the user is notified of instances of unlicensed use of his or her intellectual property, alerting him or her to the infringement so that action make be taken in the form of a Cease action or eventual prosecution. (370)

Figure 4:
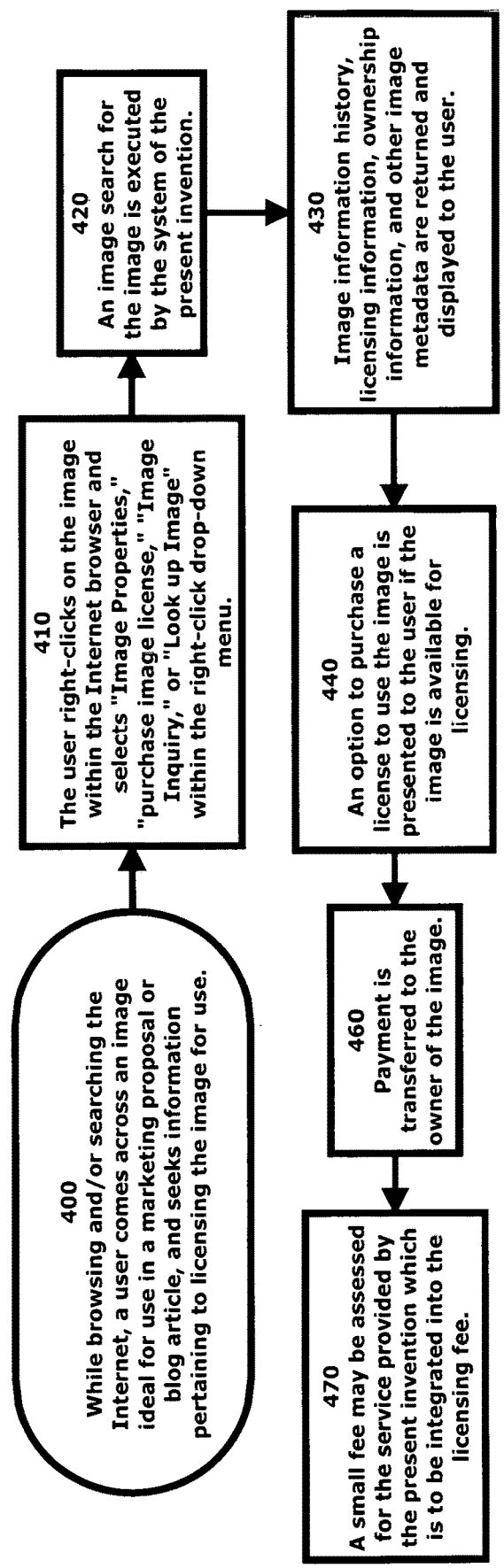
FIG. 4 exhibits a flowchart detailing the process of use of the present invention by a user seeking to inquire about, and purchase a license for, an image via the browser-plug in of the present invention.
Figure 5:
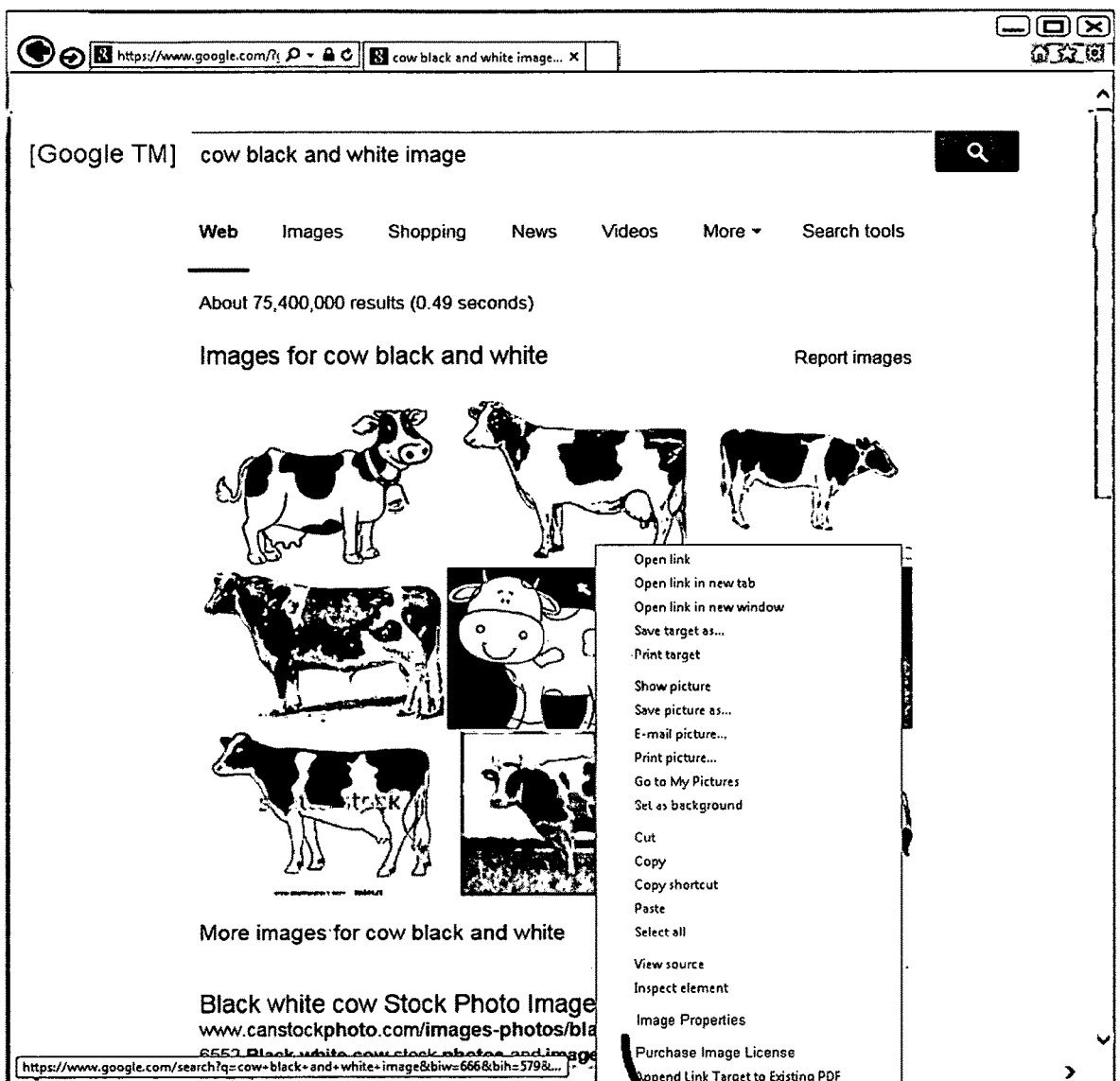
FIG. 5 shows the integration of the plugin of the system of the present invention into the right-click menu within a browser.

In a second scenario as seen in FIG. 4, the browser plug-in component of the system of the present invention is preferably employed by a user as follows:

While browsing and/or searching the Internet, a user comes across an image ideal for use in a marketing proposal or blog article, and seeks information pertaining to licensing the image for use. (400) The user right-clicks on the image within the Internet browser and selects "Image Properties," "purchase image license," "Image Inquiry," or "Look up Image" within the right-click drop-down menu. (410) An image search for the image is executed by the system of the present invention. (420) Image information history, licensing information, ownership information, and other image metadata are returned and displayed to the user. (430) An option to purchase a license to use the image is presented to the user if the image is available for licensing. (440) The user purchases the license within the online platform of the present invention. (450) Payment is transferred to the owner of the image. (460) A small fee may be assessed for the service provided by the present invention which is to be integrated into the licensing fee. (470)

It should be understood that the system of the present invention is capable of executing searches for images collected in batches or compressed files, performing a search on each individual image after the batch is uploaded, and displaying the results in order by date (or other filter) to the user.

The back-end processes performed by the system of the present invention, as shown in FIG. 1, are preferably executed roughly as follows:

First, the system receives an image or the URL of an image. (100) The system then processes a search across all algorithms (as listed above). (110) The results are collated by score and distance from the source image. (120) The results are then returned to the user. (130) If the source image requires cropping, the image is cropped using a circle, square, or rectangular cropping tool, and the search is executed again. (140) If no cropping of the source image is required, the system queries if the results require filtering. (150) If filtering is necessary, the results are filtered based on all filtering mechanisms as listed above. (160) The search is executed once more pending the completion of filtering. When filtering and the subsequent search is complete and no longer needed, licensing is queried. (170) If the results dictate that the image is available for licensing purchase, the license may be purchased, wherein license information is embedded into the image using steganography. (180) The image is then delivered to the user via HTTP download, FTP download, Cloud Service upload, or email. (190) If the user opts to not purchase the license, the process service is ceased. (195)

In terms of image compression for search, correlation of results of the search, and reconstruction of the source image, a first embodiment of the back-end processes of the present invention includes:

First, the system ingests the source image. Then, the source image is converted to grayscale. The source image is then split into overlapping pieces. Each of the overlapping pieces are then resized such that each piece is no larger than 32×32 pixels, and no smaller than 8×8 pixels. The image pieces are indexed, and each piece is trained being the source via the use of interest points, histograms, and hashes of internal image data, correlating to points for reconstruction of the source image. Additionally, the system of the present invention may detect and recognize objects in the source image prior to indexing, classifying, and producing a master set of groups and categories. It should be understood that source images are preferably compressed down to basic colors on a 256 color scale for search and classification by color data.

An additional alternate embodiment of the back-end process of the present invention includes:

First, the source image is ingested by the system. Then, the system removes the background of the source image by polarizing or creating its opposite, building a foreground mask of the source image to act as a template. Then, the foreground mask or template is applied, whereby the background of the image is removed, leaving only the foreground objects. Then, the foreground object lines are detected, creating new images of each object. Histograms are then created and interest points are detected, which are indexed and classified for image search parameters.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A method for facilitating identification of ownership and licensing of digital images and subsequent commerce of the digital images between image owners and image users on a browser-based image marketplace system, wherein the system comprises a server computer and a database storing metadata of the digital images, the method comprising:

receiving, by the server computer, a selected digital image from an image user, wherein the received digital image is a source image comprising a source image file, wherein the source image is an image or a URL of the image;

processing, by the server computer, the source image, wherein the processing the source image comprises the following steps:
converting the source image to grayscale;
splitting the converted source image into overlapping pieces; and
resizing the overlapping pieces, wherein the resizing the overlapping pieces further comprises resizing each of the overlapping pieces to be no larger than 32×32 pixels and no smaller than 8×8 pixels;

indexing, by the server computer, the each piece of the overlapping pieces with interest points, histograms, and hashes of internal image data, wherein the indexing the overlapping pieces further comprises correlating the indexed interest points, the indexed histogram and the indexed hashes to points of the source image;

generating, by the server computer, parameters of the source image for an image search by aggregating metadata of the source image from the source image file, wherein the aggregated metadata includes image color, image hue, image size, image date, image location, image resolution, and image capture device;

executing, by the server computer, the image search for instances of the source image over the Internet based on the generated parameters of the source image;

returning, by the server computer, results of the image search of the source image, wherein the results comprise image metadata of the image search relating to ownership and licensing status;

displaying, by the server computer, the results of the image search to the image user;

based on the results of the image search, providing, by the server computer, licensing information of the source image to the image user for a license purchase of the source image;

receiving, by the server computer, from the image user, information of the license purchase of the source image;

creating, by the server computer, a shell of the source image using compression and-the-indexed histograms by detecting the interest points of the source image;

storing, by the server computer, the shell of the source image in the database; and updating, by, the database with the image metadata of the image search of the source image.

2. The method of claim 1, the method further comprises:
integrating, by the server computer, steganography in the source image, wherein the integrating the steganography further comprises embedding the license information into the source image.

3. The method of claim 1, wherein the source image is an image uploaded by the image user.

* * * * *